Patented July 9, 1940

2,207,385

UNITED STATES PATENT OFFICE 2,207,385

PREPARATION OF VITAMIN CONCENTRATE

Gerald G. R. Smith, Rochester, N. Y., assignor, by mesne assignments, to Distillation Products, Inc., Rochester, N. Y., a corporation of Delaware No Drawing. Application September 21, 1936, Serial No. 101,778

6 Claims. (Cl. 202—57)

This invention relates to an improved process of obtaining fat soluble vitamin concentrates from natural oils, such as marine animal oils.

In subjecting marine animal oils, such as cod-liver oil, to molecular distillation, it has been found that vitamins A and D are present in two different forms which distill in substantially different temperature ranges. It has been shown in the co-pending application #67,332, filed March 5, 1936, in the name of K. C. D. Hickman, that substances have no fixed boiling point under molecular conditions, but distill at different rates according to the temperature. The relative boiling points are best described in relation to those of certain substances chosen as standards. Thus the low boiling form of vitamin A is obtained in maximum amounts at a temperature of about 123° C. under conditions where Celanthrene Red 3B distills at 124° C. The low boiling form of vitamin D is obtained at about 160° C.—on the same scale. The high boiling form of vitamin A, which has been found to be composed of vitamin A alcohol esters, distills at a temperature between about 180 and 235° C. A high boiling form of vitamin D distills in maximum amounts at about 194° C., but is obtained in lesser amounts at temperatures between 180 and 260° C. Since the high boiling forms of vitamins A and D distill over substantially the same range, they are obtained as a mixture, unless relatively narrow cuts are taken. Even if such procedure is followed, it is difficult to separate fractions which contain all of the high boiling A and all of the high boiling D without admixture of one with the other. Such mixtures can be redistilled and substantially segregated, but since each distillation results in at least partial decomposition, such procedure is not desirable. A further difficulty is that the distillation temperatures of these vitamins is so high that a considerable amount of the oil or glyceride itself distills, thus causing a substantial dilution of the vitamin distillates. Many such fractions are too weak to be of commercial use. Others, especially if narrow cuts are taken, are entirely suitable for therapeutic use, but are not sufficiently potent for various particular purposes. Redistillation of such material, as pointed out above, is not at present feasible.

This invention has for its object to overcome the above deficiencies of high vacuum distillation of fat soluble vitamin containing natural oils. Another object is to provide a process whereby high vacuum distillates containing high boiling forms of vitamins A and/or D can be substantially concentrated. Another object is to provide a process whereby a fraction containing vitamins A and D in the high boiling form, obtained as a mixture by the high vacuum distillation of marine animal oils, can be segregated into its individual vitamin components and the vitamins simultaneously concentrated. A still further object is to provide a process whereby a high vacuum distillate of a marine animal oil, which distillate contains the high boiling form of vitamin D and substantial amounts of glycerides, can be substantially concentrated and a vitamin D containing material of high potency obtained. Other objects will appear hereinafter.

These objects are accomplished by saponifying a high vacuum distillate containing vitamins A and/or D in the high boiling form, adding a solvent for the non-saponifiable vitamin fraction, which solvent has a substantially different boiling point under molecular conditions than the vitamin and subjecting the solvent-vitamin mixture to high vacuum distillation to separate the vitamins therefrom.

In the following examples and description, I have described several of the preferred embodiments of my invention but it is to be understood that they are set forth for purposes of illustration and not as limitations thereof.

The high boiling fraction containing either vitamin A or D alone, or a mixture of the two, is subjected to saponification in order to destroy the glycerides which would otherwise contaminate the vitamins on redistillation. It would seem that since the non-saponifiable fraction was insoluble it could be separated without a solvent. In practice, however, it has such small bulk and is so thoroughly entrained with the soapy emulsion that centrifuging or prolonged standing is necessary to cause the separation, which is then incomplete. Since the vitamin active components are present as a non-saponifiable portion, they can be dissolved in a solvent having a different distilling point from that of the vitamin constituents and the mixture of solvent and vitamins thus obtained can be subjected to high vacuum distillation and the vitamins separated as individual fractions with ease. The saponification treatment is preferably complete, but if it is desired to obtain a concentrate of predetermined potency or to have part of the original oil distill and be present with the vitamin distillate, it is possible to saponify only part of the glycerides, the non-saponified portion being separated as an upper layer with the vitamins and this material can be separated and directly distilled or dissolved in a solvent and distilled as described above.

When employing the expedient of partial saponification the unsaponified portion of the oil acts in the place of, or as a solvent. Where at least a third of the oil is saponified nearly all of the triglyceride molecules are altered. Mono and diglycerides are produced and some of these polymerize to form poly-glyceride fatty acid complexes. On distillation, therefore, some of the oil distills at temperatures lower than the vitamin and some at temperatures much higher. The middle portion containing substantially all the vitamin comes over in purified and concentrated condition.

The saponification treatment is carried out in the same manner that has become conventional in the vitamin art. Such procedure is preferably carried out in an inert atmosphere in order to avoid oxidation of potent constituents. Any alkali such as caustic potash, caustic soda, or the usual equivalents, such as lime, ammonia, etc., may be used as a saponifying agent. It is sometimes desirable to add a small amount of alcohol, such as ethyl or methyl alcohol, to assist rapid saponification with the minimum application of heat or without external heating at all. The saponifying agents are preferably employed as strong solutions, although solids are entirely satisfactory and are usually necessary with alkalies of low solubility, such as lime. If water is used during the saponification treatment, the non-saponified material separates out as an upper layer and soaps remain dissolved in the aqueous portion. When no water is used, or relatively small amounts of water, it is desirable to dilute the saponification mixture with water before adding the solvent. This procedure, in fact, is usually desirable regardless of the saponification treatment used. Since the soaps obtained vary in degree of solubility, depending on the type of base used, it is desirable to employ a base which gives a soap which is readily soluble in water.

After saponification is completed, hot water is added and a portion of solvent or extracting oil is added. The materials are agitated and allowed to settle. If emulsions are formed the usual expedient for emulsion breaking, such as heating, may be used. Such emulsions seldom form in the initial extractions, but may do so in the following applications of solvent. After the mixture has settled, the top solvent-vitamin layer is withdrawn and another portion of solvent may be added in order to complete the removal of the vitamins. The number of solvent extractions varies according to the mount of solvent used, with the period of mixing, with the temperature and with the type of distillate treated and the amount of vitamin present therein. The procedure cannot, therefore, be limited to specific proportion but is carried out in well known manner using conventional solvent extraction methods. After the vitamins have been completely dissolved in the solvent, the different solvent extracts are combined and either washed with water to remove residual soaps or acidified to convert the soaps into fatty acids and then washed to remove residual acidifying acid and salts. The material is then dried and preferably degassed and then conveyed to a high vacuum still where the vitamin constitutent is recovered.

In selecting a solvent for the extraction of the solvents from the saponified oil, it is necessary to use a solvent which has a substantially different boiling point or distilling temperature than the vitamin constituents. It is, of course, also necessary to use a solvent which has a good solvent power for the vitamins. Glycerides of various types can be used and I have found that a most suitable solvent is one which is obtained as a residue from the molecular distillation of whole marine animal oils. The material consists almost entirely of fatty glycerides having very low vapor pressures and it distills at such a high temperature that the vitamin can be distilled off carrying very little diluent oil with it. If desired, such a low vapor pressure solvent can be mixed with a small amount of higher vapor pressure solvent, such as a higher vapor pressure fish oil fraction, which minor portion will distill with the vitamins, thus giving a distillate having a larger volume and, if desired, a predetermined degree of potency. Instead of using the distillation residue, a whole fish oil or any other suitable solvent such as phthalate esters etc. having a suitable vapor pressure can be used.

As explained above, the distillate initially treated is one containing either of the high boiling forms of vitamin A or D, or both. It may be a fraction which contains any proportion of the vitamin and the glyceride. Since both of these high boiling forms can be substantially concentrated on the first distillation of the fish oil, it is desirable to segregate as much of the potent materials as possible on the first distillation and to collect the remaining materials as a broad cut containing considerable amounts of the oil and treat this according to my invention. By operating in this manner, a substantial proportion of the high boiling forms is recovered as a concentrate of high potency by one distillation treatment and it is, theferore, unnecessary to further concentrate them or subject them to the redistillation and saponification treatment outlined above. Thus, on distilling the initial fish oil the high boiling forms of vitamins A and D distill in maximum amounts at about 190–200° C., compared with Quinizarine green at 220° C. This fraction is separated and is ready for immediate therapeutic use without further treatment unless dilution with an inert oil is necessary to bring it down to a potency suitable for administration. Fractions from 150–190 and 200–260° can be separated and treated according to the herein described invention. It is to be understood that this constitutes my preferred mode of operation and that my invention is not to be limited to such procedure, since it is possible and, in many cases, desirable to separate the fractions in a different manner and treat particular fractions, or to separate the entire high boiling vitamins as one fraction and then treat the whole material.

The following example illustrates one specific mode of carying out my invention:

88.5 grams of a cod liver oil molecular distillation fraction distilling at 190°–250° C. were saponified with 30 grams caustic potash dissolved in 50 cc. of water, an addition of 50 cc. of ethyl alcohol being made to assist the process.

450 cc. of hot water at about 80° C. were added. Four separate extractions or washings were given, using the residual oil from a cod liver oil distillation as the extraction material. The quantities used were:

| | Cubic centimeters |
|---|---|
| 1st extraction | 600 |
| 2nd extraction | 300 |
| 3rd extraction | 300 |
| 4th extraction | 200 |

The collected oil portions of the above separation were then treated with excess dilute acetic acid and followed by separation and successive water washings till the wash water no longer showed acid to indicators. The mixture was dried degassed and subjected to molecular distillation. Vitamin A in alcohol form distilled at 125 the vitamin D was obtained in a fraction of high potency at 170° C.

It is to be understood that many variations and changes can be made in the above described procedure without departing from the spirit and scope of my invention. For instance, it is possible to employ a solvent which has a lower distillation point under molecular conditions than the vitamin and distill off the solvent leaving the vitamin as a residue, or also distill off the vitamin as a separate fraction. Such procedure is not as advantageous, however, since no material is left to dilute the vitamin and decomposition on the heating surface is thereby increased. All operations are preferably carried out under non-oxidizing conditions and can conveniently be carried out in the presence of an inert atmosphere. All saponification, washing and solvent extraction procedure is carried out in the manner conventional in the vitamin and chemical art and can be varied greatly within the scope of my invention.

The final high vacuum treatment is preferably carried out under molecular distillation conditions. This type of distillation involves the use of such a low pressure that the distilling molecules have an appreciable mean free path and are condensed on a surface located at a distance from the evaporated surface of less than about the mean free path of the molecules of residual gas. Pressures below .1 of a millimeter and preferably below .01 of a millimeter, such as .005 to .0001 millimeters, are used. Distances separating the evaporative and condensing surfaces are usually less than about 12" such as, for instance ½ to 6 inches. Since the mean free path is inversely proportional to the pressure, there is no limit to the distance which can be used or lower limit to the pressure but, due to the difficulty of producing and maintaining extremely low pressures, I have found it most economical to operate under conditions set forth above. It has been found that vitamins can be distilled under conditions which do not involve molecular distillation. In such case, the surfaces are separated by a distance many times the mean free path and the distilling molecules travel from the evaporative to the condensing surfaces by diffusion and/or convection. Such procedure can be used in my process and is to be understood as being within that type of distillation known as high vacuum short path distillation. One aspect of such non-molecular high vacuum distillation is disclosed in the copending application to K. C. D. Hickman No. 99,632, filed Sept. 5, 1936.

The fractions treated in accordance with my process can be obtained by any type of high vacuum distillation of any marine animal oil containing fat soluble vitamins such as cod-liver, halibut, liver, tuna, salmon, and other fish oils. They are preferably produced by a short path high vacuum or molecular distillation process of the nature of that described in the Hickman Patent 1,925,559 or by the process of the nature of that described in the above referred to Hickman application.

It has been definitely established that the high boiling form of vitamin A contained in the distillates treated in the above-described process is an ester. The saponification treatment converts the ester into vitamin A alcohol which distills at about 118° or at the same temperature that the low boiling form of vitamin A is obtained. It is not known what the constitution of the high boiling form of vitamin D is, but the saponification treatment converts it into a low boiling form which distills at a temperature approximating that of the low boiling form of vitamin D. This conversion product appears to have the same anti-rachitic potency that the low boiling form has. My invention, therefore, has the distinct advantage that the oil is not only removed and concentration made easier, but also that the vitamins can be distilled at a substantially lower temperature and destruction during distillation considerably reduced. Since the vitamins are converted into these lower boiling forms by the saponification treatment the solvent is selected upon the basis of its vapor pressure relation to these compounds. In other words the solvent selected should have a different distillation point from that of the vitamin constituent in its converted or low boiling form.

What I claim is:
1. The process which comprises subjecting a molecular distillate of cod-liver oil having a molecular distillation range of between about 180 and 260° C. and containing the high boiling form of vitamin D to saponification, adding a glyceride consisting of a molecular distillation residue of a fish oil, to the saponification mixture, separating the mixture of non-saponifiable matter and glyceride and subjecting it to molecular distillation and recovering the vitamins in the distillate.

2. The process which comprises subjecting a molecular distillate of a fish oil having a molecular distillation range of between 180° C. and 260° C. and containing the high boiling form of vitamin A or D to saponification, adding a vitamin solvent which has a lower vapor pressure than the vitamin constituents, separating the vitamin-solvent mixture, subjecting it to molecular distillation and separating a fraction containing a vitamin.

3. The process which comprises in combination, subjecting a vitamin containing marine animal oil to high vacuum distillation, separating a fraction which contains the high boiling form of vitamin D, subjecting this fraction to a saponification treatment, separating the non-saponified portion by dissolving in a solvent having a different boiling point than the vitamin and subjecting it to high vacuum distillation to recover the vitamin content thereof.

4. The process which comprises in combination, subjecting a vitamin containing fish oil to high vacuum, short path distillation, separating a fraction which contains the high boiling form of vitamin D, saponifying this fraction, dissolving the non-saponifiable portion in a solvent for the vitamin contained therein, which solvent has a different distillation temperature from the vitamin, subjecting the solvent-vitamin mixture to high vacuum, short path distillation and separating the vitamin as a distillate.

5. The process which comprises in combination, subjecting a vitamin containing fish oil to short path distillation at a pressure of less than about .1 mm. separating a fraction which distills at between 180° and 260° C. and which contains the high boiling form of vitamin D, saponifying this fraction, dissolving the non-saponifiable portion in a solvent for the vitamin contained therein, which solvent has a lower vapor pressure than the vitamin, subjecting this mixture to high vacuum short path distillation and separating the vitamin in a fraction substantially free of the solvent.

6. The process which comprises in combination subjecting a vitamin containing marine animal oil to high vacuum distillation, separating a fraction which contains the high boiling forms of vitamins A and D, saponifying this fraction, adding to the non-saponifiable portion a solvent which has a substantially lower vapor pressure than the vitamins contained therein and subjecting this mixture to high vacuum distillation to distill off and separate the vitamins therefrom.

GERALD G. R. SMITH.